United States Patent
Aoyama

(10) Patent No.: US 11,122,234 B2
(45) Date of Patent: Sep. 14, 2021

(54) IMAGE OUTPUT APPARATUS, CONTROL METHOD THEREOF AND COMPUTER-READABLE STORAGE MEDIUM

(71) Applicant: CANON KABUSHIKI KAISHA, Tokyo (JP)

(72) Inventor: Satoshi Aoyama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/829,335

(22) Filed: Mar. 25, 2020

(65) Prior Publication Data
US 2020/0314379 A1     Oct. 1, 2020

(30) Foreign Application Priority Data

Mar. 26, 2019 (JP) .............................. JP2019-058901

(51) Int. Cl.
*H04N 5/445* (2011.01)
(52) U.S. Cl.
CPC ............................ *H04N 5/44504* (2013.01)
(58) Field of Classification Search
CPC ...... H04N 5/445; H04N 5/45; H04N 1/00442; H04N 1/00445; H04N 1/00448; H04N 1/0045; H04N 1/00453; H04N 1/00458; H04N 4/44504; H04N 5/44504
See application file for complete search history.

(56) References Cited

U.S. PATENT DOCUMENTS

| | | | |
|---|---|---|---|
| 2011/0176024 A1* | 7/2011 | Kwon | H04N 5/2355 348/222.1 |
| 2017/0018292 A1* | 1/2017 | Yahata | G11B 27/105 |
| 2017/0262052 A1* | 9/2017 | Richmond | G06T 11/60 |
| 2017/0272686 A1* | 9/2017 | Fukushima | G09G 5/10 |
| 2017/0287120 A1* | 10/2017 | Sato | G06T 5/007 |
| 2018/0018932 A1* | 1/2018 | Atkins | G09G 5/026 |
| 2018/0144693 A1* | 5/2018 | Saito | H04N 9/87 |
| 2018/0278985 A1* | 9/2018 | De Haan | H04N 21/845 |
| 2018/0322679 A1* | 11/2018 | Kunkel | G06K 9/6201 |
| 2018/0336669 A1* | 11/2018 | Mertens | H04N 5/57 |
| 2018/0374192 A1* | 12/2018 | Kunkel | G06T 15/205 |
| 2018/0376194 A1* | 12/2018 | Oh | H04N 21/4334 |
| 2019/0014385 A1* | 1/2019 | Yoshiyama | H04N 5/20 |

(Continued)

FOREIGN PATENT DOCUMENTS

| | | | |
|---|---|---|---|
| JP | 2017-068207 A | 4/2017 | |
| JP | 2018-117343 A | 7/2018 | |
| WO | WO-2014130213 A1 * | 8/2014 | G06T 7/90 |

*Primary Examiner* — David E Harvey
(74) *Attorney, Agent, or Firm* — Cowan, Liebowitz & Latman, P.C.

(57) ABSTRACT

An image output apparatus, which outputs data for a multiple playback displaying one frame in which two or more images are arranged, reads a set number of images in the multiple playback from a recording unit, generates an image for display for the multiple playback by using the set number of images read from the recording unit, sets a maximum luminance information of the image for display to a highest luminance among luminance indicated by a maximum luminance information of an HDR image included in the set number of images, and adds the set maximum luminance information to the generated image for display and output the image for display.

17 Claims, 9 Drawing Sheets

(56) References Cited

U.S. PATENT DOCUMENTS

| | | | |
|---|---|---|---|
| 2019/0043233 A1* | 2/2019 | Kim | G06T 5/40 |
| 2019/0222818 A1* | 7/2019 | Yamamoto | H04N 5/20 |
| 2019/0289217 A1* | 9/2019 | Nakagawa | H04N 5/23293 |
| 2019/0355107 A1* | 11/2019 | Aoki | G06T 5/009 |
| 2020/0053271 A1* | 2/2020 | Aiba | G09G 5/10 |
| 2020/0134882 A1* | 4/2020 | Sato | G06T 5/009 |
| 2020/0265561 A1* | 8/2020 | Park | G06T 5/009 |
| 2021/0051344 A1* | 2/2021 | Talstra | H04N 19/172 |

* cited by examiner

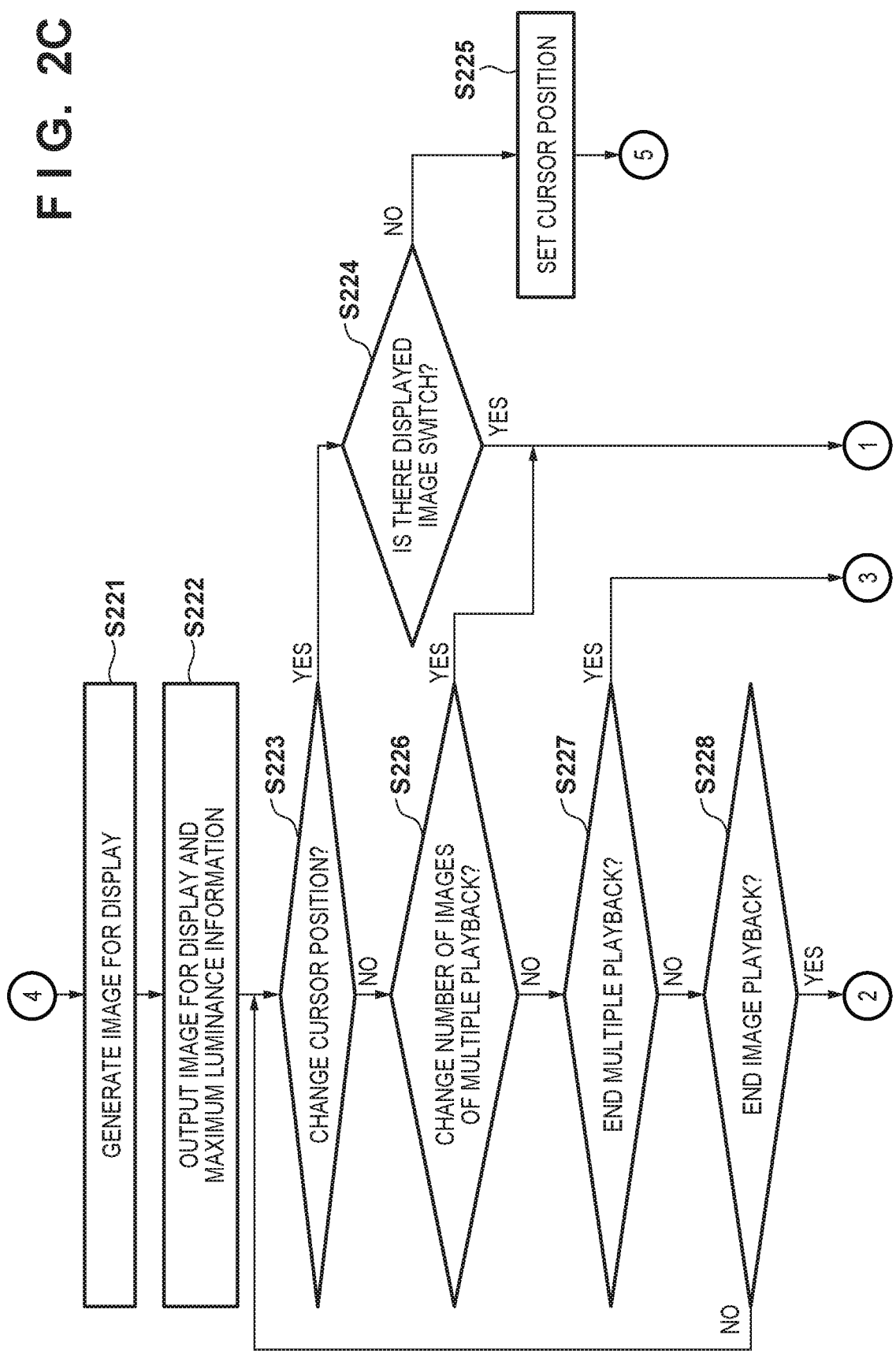

MAXIMUM LUMINANCE:600(nit)

MAXIMUM LUMINANCE: 800(nit)

IMAGE OUTPUT APPARATUS, CONTROL METHOD THEREOF AND COMPUTER-READABLE STORAGE MEDIUM

BACKGROUND OF THE INVENTION

Field of the Invention

The present invention relates to an image output apparatus, a control method thereof and a computer-readable storage medium.

Description of the Related Art

In recent years, imaging and display based on High Dynamic Range (HDR) have begun in earnest, and much effort has been made for HDR-related standardization and commercialization. For instance, standards such as HDR10+ define information to be added such as Maximum Content Light Level (MaxCLL) indicating a maximum luminance value for each frame or scene, Maximum Frame Average Light Level (MaxFALL) indicating an average luminance value for each frame. Information such as the MaxCLL or the MaxFALL can be transmitted between apparatuses in compliance with the standards such as HDMI (registered trademark) standard. Thus, for instance, dynamic communication of an image data and a luminance information of the image data captured by a digital camera or a video camera to a display device via the HDMI (registered trademark) facilitates adjustment of display luminance of the display device at frame level.

On the other hand, as a method for checking the image data on the display, a list of a plurality of image data is generally displayed. A user can use the list display to compare images or select appropriate image data from a plurality of image data. Even in such a list display, an appropriate HDR display is desirably provided on the display device. For instance, in Japanese Patent Laid-Open No. 2018-117343 (hereinafter, Patent Document 1), a plurality of image data can be displayed such that image data in a specific region has an appropriate luminance in accordance with a layout.

However, the technology disclosed in Patent Document 1 is based on a presumption that displayed image data in a layout or a window have differences. Thus, for instance, in the list display in which a plurality of image data having consistently the same size are displayed in an orderly manner as typically used for a digital camera, appropriately displaying all HDR image data displayed is difficult.

SUMMARY OF THE INVENTION

The present invention provides a technology for enabling display at an appropriate luminance when a plurality of images including an HDR image are displayed by a multiple playback.

According to one aspect of the present invention, there is provided an image output apparatus configured to output data for a multiple playback, the multiple playback displaying two or more images arranged in one frame, the image output apparatus comprising: one or more processors; and at least one memory coupled to the one or more processors, the at least one memory having instructions stored thereon which, when executed by the one or more processors, cause the one or more processors to function as: a reading unit configured to read a set number of images in the multiple playback from a recording unit; a generation unit configured to generate an image for display for the multiple playback by using the set number of images read by the reading unit; a setting unit configured to set a maximum luminance information of the image for display to a highest luminance among luminance indicated by a maximum luminance information of an HDR image included in the set number of images read by the reading unit; and an output unit configured to add the maximum luminance information set by the setting unit to the image for display generated by the generation unit and to output the image for display.

According to another aspect of the present invention, there is provided an image output apparatus configured to output data for a multiple playback, the multiple playback displaying two or more images arranged in one frame, the image output apparatus comprising: one or more processors; and at least one memory coupled to the one or more processors, the at least one memory having instructions stored thereon which, when executed by the one or more processors, cause the one or more processors to function as: a reading unit configured to read a set number of images in the multiple playback from a recording unit; a generation unit configured to generate an image for display for the multiple playback by using the set number of images read by the reading unit; a setting unit configured to set, in a case where an image designated by a user operation among the set number of images is an HDR image, a luminance indicated by a maximum luminance information of the HDR image for a display region of the designated image in the image for display; and an output unit configured to add information indicating the luminance and the display region set by the setting unit to the image for display generated by the generation unit and to output the image for display.

According to another aspect of the present invention, there is provided a control method for an image output apparatus configured to output data for a multiple playback, the multiple playback displaying two or more images arranged in one frame, the control method comprising: reading a set number of images in the multiple playback from a recording unit; generating an image for display for the multiple playback by using the set number of images; setting a maximum luminance information of the image for display to a highest luminance among luminance indicated by a maximum luminance information of an HDR image included in the set number of images; and adding the maximum luminance information to the image for display and outputting the image for display.

According to another aspect of the present invention, there is provided a control method for an image output apparatus configured to output data for a multiple playback displaying two or more images arranged in one frame, the control method comprising: reading a set number of images in the multiple playback from a recording unit; generating an image for display for the multiple playback by using the set number of images; setting, in a case where an image designated by a user operation among the set number of images is an HDR image, a luminance indicated by a maximum luminance information of the HDR image, for a display region of the designated image in the image for display; and adding information indicating the luminance and the display region to the image for display and outputting the image for display.

According to another aspect of the present invention, there is provided a non-transitory computer-readable storage medium including a program stored therein, the program being used to cause a computer to execute a control method for an image output apparatus configured to output data for a multiple playback displaying two or more images arranged in one frame, the control method comprising: reading a set number of images in the multiple playback from a recording unit; generating an image for display for the multiple playback by using the set number of images; setting a maximum luminance information of the image for display to a highest luminance among luminance indicated by a maximum luminance information of an HDR image included in the set number of images; and adding the set maximum luminance information to the image for display and outputting the image for display.

According to another aspect of the present invention, there is provided a non-transitory computer-readable storage medium including a program stored therein, the program being used to cause a computer to execute a control method for an image output apparatus configured to output data for a multiple playback displaying two or more images arranged in one frame, the control method comprising: reading a set number of images in the multiple playback from a recording unit; generating an image for display for the multiple playback by using the set number of images; setting, in a case where an image designated by a user operation among the set number of images is an HDR image, a luminance indicated by a maximum luminance information of the HDR image, for a display region of the designated image in the image for display; and adding information indicating the set luminance and the display region to the image for display and outputting the image for display.

Further features of the present invention will become apparent from the following description of exemplary embodiments with reference to the attached drawings.

BRIEF DESCRIPTION OF THE DRAWINGS

FIGS. 2A to 2C are flowcharts illustrating an operation in an image playback mode (single playback) according to a first embodiment.

DESCRIPTION OF THE EMBODIMENTS

Figure 1A:
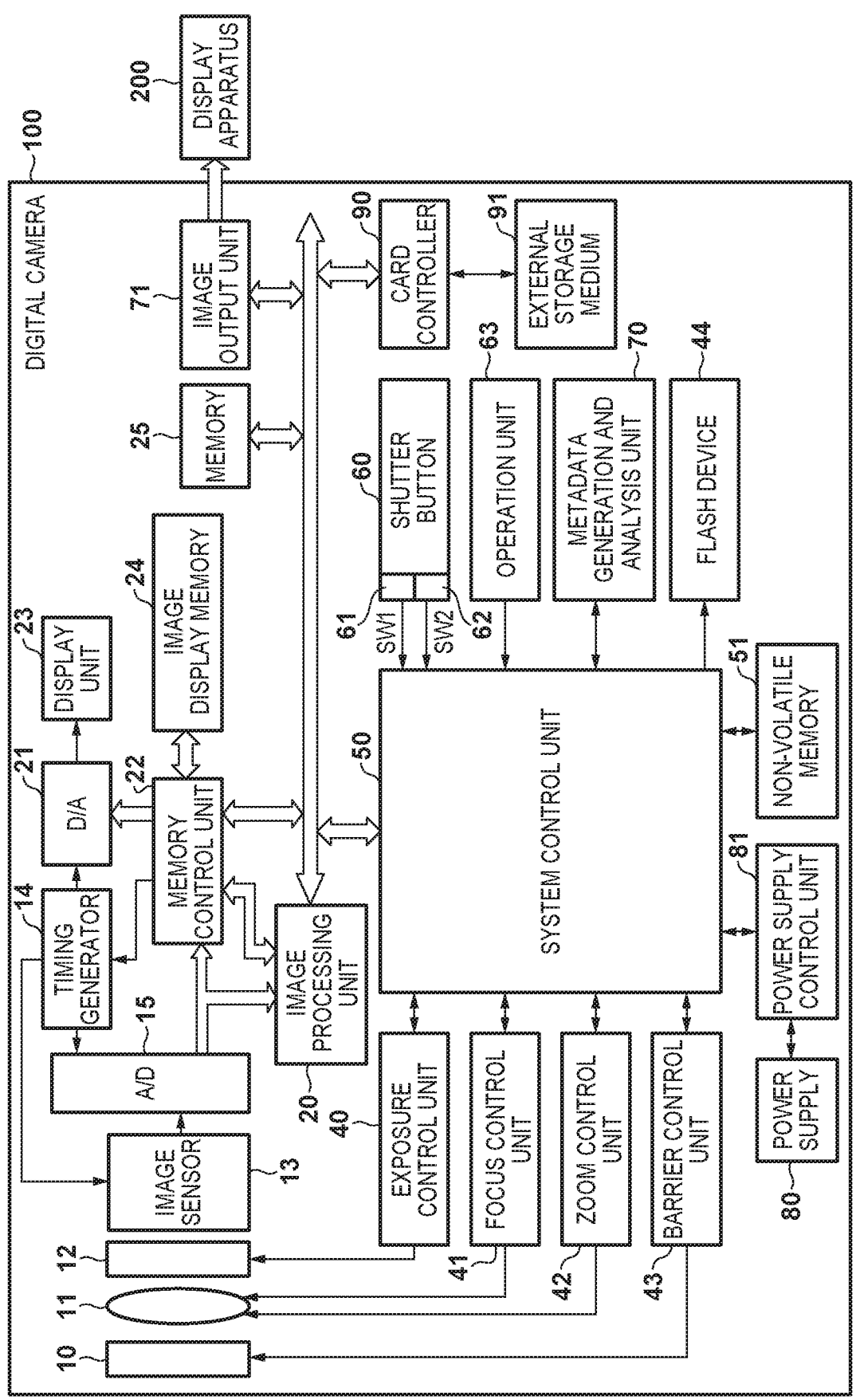
FIG. 1A is a block diagram illustrating a configuration example of a digital camera according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Note that a digital camera is hereinafter exemplified as an image output apparatus reading two or more predetermined number of images from a plurality of images recorded in a recording apparatus and displaying the read images on a display apparatus but that, of course, no such limitation is imposed on the image output apparatus according to the present invention. The image output apparatus according to the present invention may be any apparatus as long as the image output apparatus reads images recorded in a recording apparatus and displays the images on a display apparatus. The image output apparatus may be, for instance, a smart phone or a tablet PC.

First Embodiment

FIG. 1A is a block diagram illustrating a configuration example of a digital camera 100 according to a first embodiment of the present invention.

A barrier 10 is a protective member covering an imaging unit of the digital camera 100 including an imaging lens 11 to prevent contamination and breakage of the imaging unit. The imaging lens 11 forms an optical image on an image sensing surface of an image sensor 13. A shutter 12 includes an aperture function. The image sensor 13 converts the optical image formed on the image sensing surface into an electrical signal. The image sensor 13 is constituted by, for instance, a CCD or a CMOS element. An A/D converter 15 converts an analog signal output from the image sensor 13 into a digital signal. The digital signal converted by the A/D converter 15 is written to a memory 25 as what is called Raw image data. In addition, development parameters corresponding to each Raw image data are generated based on information obtained during imaging, and the development parameters are written to the memory 25. The development parameters include various parameters used in image processing for storing an image in a JPEG format or the like. Examples of the development parameters include an exposure setting, a white balance, a color space, and a contrast.

A timing generator 14 provides a clock signal and a control signal to the image sensor 13, the A/D converter 15, and a D/A converter 21. The timing generator 14 is controlled by a memory control unit 22 and a system control unit 50. An image processing unit 20 executes various types of image processing such as a predetermined pixel interpolation processing, a color conversion processing, a compensation processing, and a resizing processing on data from the A/D converter 15 or the memory control unit 22. Additionally, the image processing unit 20 executes predetermined calculation processing using the captured image data, and provides an obtained calculation result to the system control unit 50. The system control unit 50 controls an exposure control unit 40 and a focus control unit 41 based on the provided calculation result to achieve an autofocus (AF) processing, an automatic exposure (AE) processing, and an electronic flash (EF) processing.

Note that the image processing unit 20 executes predetermined calculation processing using the captured image data, and executes an automatic white balance (AWB) processing based on an obtained calculation result. Furthermore, the image processing unit 20 loads an image stored in the memory 25 and executes a compression processing or a decompression processing in the JPEG format, a MPEG-4 AVC, or a High Efficiency Video Coding (HEVC). The image processing unit 20 writes processed data to the memory 25.

The memory control unit 22 controls the A/D converter 15, the timing generator 14, the image processing unit 20, an image display memory 24, the D/A converter 21, and the memory 25. The Raw image data generated through the A/D converter 15 is written to the image display memory 24 or the memory 25 via the image processing unit 20 and the memory control unit 22 or directly via the memory control unit 22.

The image display memory 24, the D/A converters 21, and a TFT LCD constitute a display unit 23. Image data for display written to the image display memory 24 is displayed on the display unit 23 via the D/A converter 21. An electronic viewfinder function for displaying a live image can be implemented by displaying the captured image data sequentially using the display unit 23. The memory 25 stores captured still images or moving images. The memory 25 is provided with a sufficient amount of storage to store a predetermined number of still images or a predetermined time of moving images. Additionally, the memory 25 can also be used as a work area for the system control unit 50.

The exposure control unit 40 controls the shutter 12 having an ability of the aperture function. Additionally, the exposure control 40 also has a flash exposure control function, working with a flash device 44. The focus control unit 41 controls a focusing of the imaging lens 11. A zoom control unit 42 controls a zooming of the imaging lens 11. A barrier control unit 43 controls an operation of the barrier 10 serving as the protective member. The flash device 44 has an AF assist light projector function and the flash exposure control function.

The system control unit 50 controls the whole digital camera 100. A non-volatile memory 51 is an electrically erasable and recordable non-volatile memory. For instance, an EEPROM is used as the non-volatile memory 51. Note that not only programs but also map information and the like are recorded in the non-volatile memory 51. Additionally, the system control unit 50 executes an image playback processing for displaying images (still images or moving images) recorded in an external storage medium 91 on an external display apparatus 200. A functional configuration for executing the image playback processing and an operation for the image playback processing will be described below.

A shutter switch 61 (SW1) is turned ON during an operation of a shutter button 60 and instructs the start of an operation such as the autofocus (AF) processing, the automatic exposure (AE) processing, the auto white balance (AWB) processing, and the electronic flash (EF) processing. A shutter switch 62 (SW2) is turned ON when the operation of the shutter button 60 is completed and instructs the start of a sequence of image capture operations including an exposure processing, a development processing, and a recording processing. In the exposure processing, a signal read from the image sensor 13 is written to the memory 25 as the Raw data via the A/D converter 15 and the memory control unit 22. In the development processing, the Raw data written to the memory 25 is developed by using calculations in the image processing unit 20 and the memory control unit 22, and is written to the memory 25 as image data. In the recording processing, the image data is read from the memory 25, compressed by the image processing unit 20, and stored in the memory 25. The image data is then written to the external storage medium 91 via a card controller 90.

An operation unit 63 includes various buttons, a touch panel, and the like. For instance, the operation unit 63 includes a power button, a menu button, a mode switch for switching among a shooting mode/a playback mode/other special shooting mode, a directional pad, a set button, a macro button, and a multi-screen reproduction page-break button. Additionally, for instance, the operation unit 63 includes a flash setting button, a single shooting/a continuous shooting/a self-timer switching button, a menu movement+(plus) button, a menu movement-(minus) button, a captured image quality selection button, an exposure compensation button, a date/time setting button, and the like.

A metadata generation and analysis unit 70 generates metadata of the image data based on information obtained during imaging, at the time of recording the image data in the external storage medium 91. Additionally, the metadata generation and analysis unit 70 analyzes the metadata added to the image data, at the time of loading the image data recorded in the external storage medium 91. For instance, at the time of recording an HDR image, the metadata generation and analysis unit 70 generates the metadata based on information of the image processing unit 20 during imaging, and adds the metadata to the image data. The metadata in this case includes, for instance, information regarding a luminance of the image data such as a maximum luminance information and an average luminance information of the image data, and a characteristic information of a subject included in the image data. Additionally, at the time of recording moving image data, the metadata generation and analysis unit 70 generates and adds the metadata to each frame.

An image output unit 71 outputs image data captured by the digital camera 100 or image data recorded in the external storage medium 91 to the external display apparatus 200 connected to the digital camera 100. For instance, the HDMI (registered trademark) standard is used for connection to the external display apparatus 200. The image output unit 71 transmits a dynamic metadata compatible with a HDMI2.1 together with the image data to allow the external display apparatus 200 can set the luminance, a saturation, the contrast of the image data, and the like, appropriately at frame level and display the image data.

A power supply 80 includes primary batteries such as an alkaline battery or a lithium battery, secondary batteries such as an NiCd battery, an NiMH battery, and a lithium-ion battery, and an AC adapter. A power supply control unit 81 supplies a power supplied from the power supply 80 to each unit of the digital camera 100. The card controller 90 transmits data to, and receives data from the external storage medium 91 such as a memory card. The external storage medium 91 is constituted by, for instance, a memory card, and records images (still images or moving images) captured by the digital camera 100X).

Figure 1B:
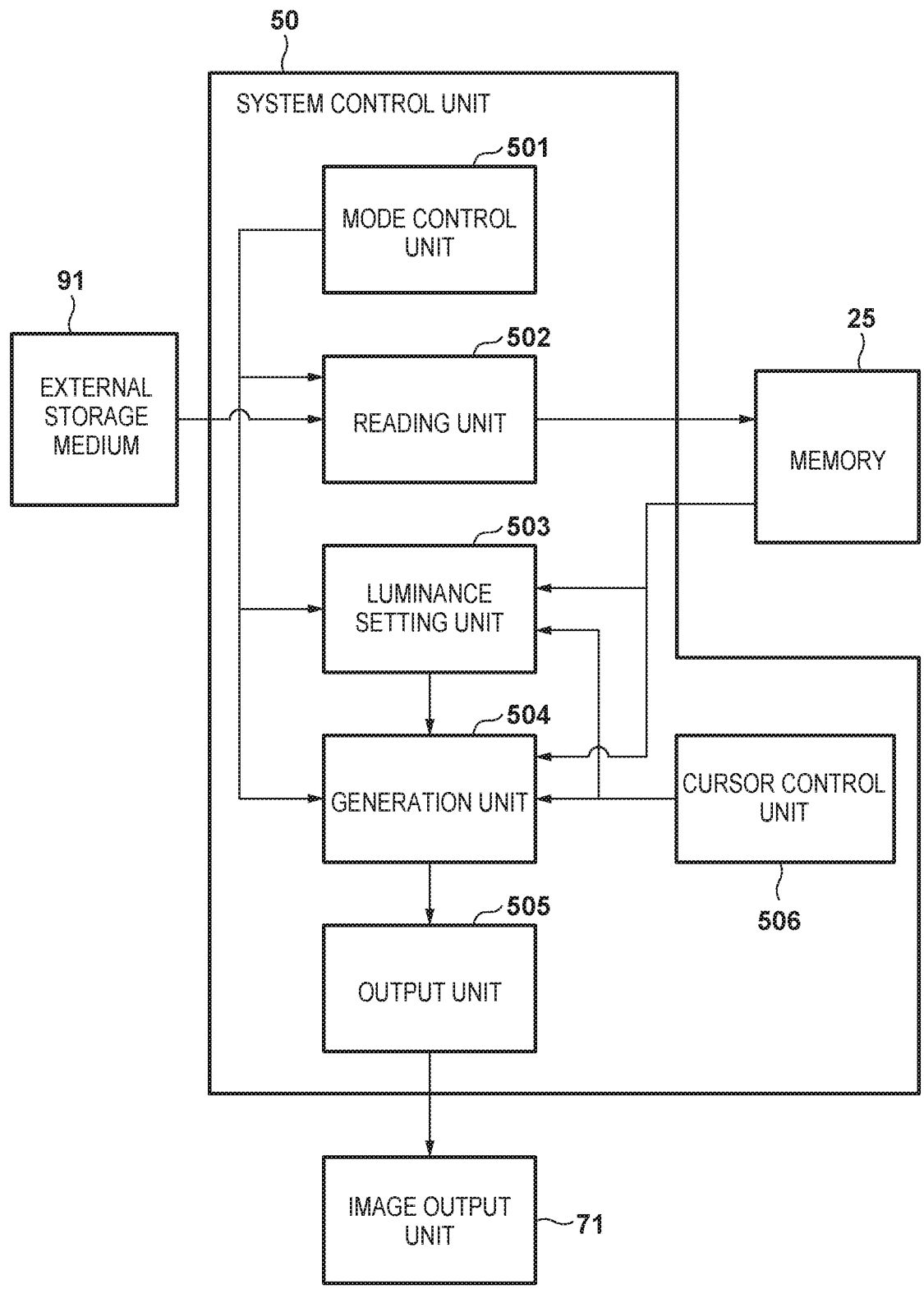
FIG. 1B is a block diagram illustrating a functional configuration example of a system control unit.

FIG. 1B is a block diagram illustrating a functional configuration example of the system control unit 50 involved in the image playback processing according to the present embodiment. A mode control unit 501 controls two modes of a single playback mode and a multiple playback mode as an image playback mode. In the single playback mode, as the mode of image playback, a single playback displaying one image on a whole screen, is executed. In the multiple playback mode, a multiple playback is executed in which two or more images are arranged in one frame for display.

A reading unit 502 reads, from the external storage medium 91, a number of (set number of) images required for image display in one frame in the playback mode instructed by the mode control unit 501 and causes the memory 25 to hold the images. In the single playback mode, the set number of images is one, and in the multiple playback mode, the set number of images is two or more. In the present embodiment, the multiple playback mode includes a mode in which 2×2 images are displayed in one frame and a mode in which 3×3 images are displayed in one frame. The set number of images in the multiple playback mode is four or nine.

A generation unit 504 generates an image for display in accordance with the playback mode designated by the mode control unit 501, using a set number of images read by the reading unit 502. In the single playback mode, the generation unit 504 generates an image for display for single playback in which one image is displayed in one frame. In the multiple playback mode, the generation unit 504 generates an image for display for multiple playback in which a set number of images to be two or more are arranged and displayed in one frame.

In the single playback mode, in a case where the image read by the reading unit 502 is the HDR image, a luminance setting unit 503 sets the maximum luminance information of the image for display generated by the generation unit 504 to the luminance indicated by the maximum luminance information of the image. In the single playback mode, in a case where the image read by the reading unit 502 is not the HDR image, the luminance setting unit 503 sets the maximum luminance information of the image for display to an initially set luminance (e.g., a luminance for an SDR is used in the present embodiment). Additionally, in the multiple playback mode, the luminance setting unit 503 sets the maximum luminance information of the image for display to the highest luminance among the luminance indicated by the maximum luminance information of the HDR image included in the set number of images read by the reading unit 502. In a case where the set number of images read by the reading unit 502 includes no HDR image, the luminance setting unit 503 sets the maximum luminance information of the image for display to the predetermined luminance (for instance, the luminance for the SDR is used in the present embodiment).

An output unit 505 adds the maximum luminance information set by the luminance setting unit 503 to the image for display generated by the generation unit 504, and outputs the resultant image for display to the display apparatus 200 via the image output unit 71. A cursor control unit 506 moves a cursor position in response to a user operation. The cursor is used in a multiple playback mode to change a combination of a plurality of images displayed in one frame, or to designate one of a plurality of images, for instance.

Figure 2A:
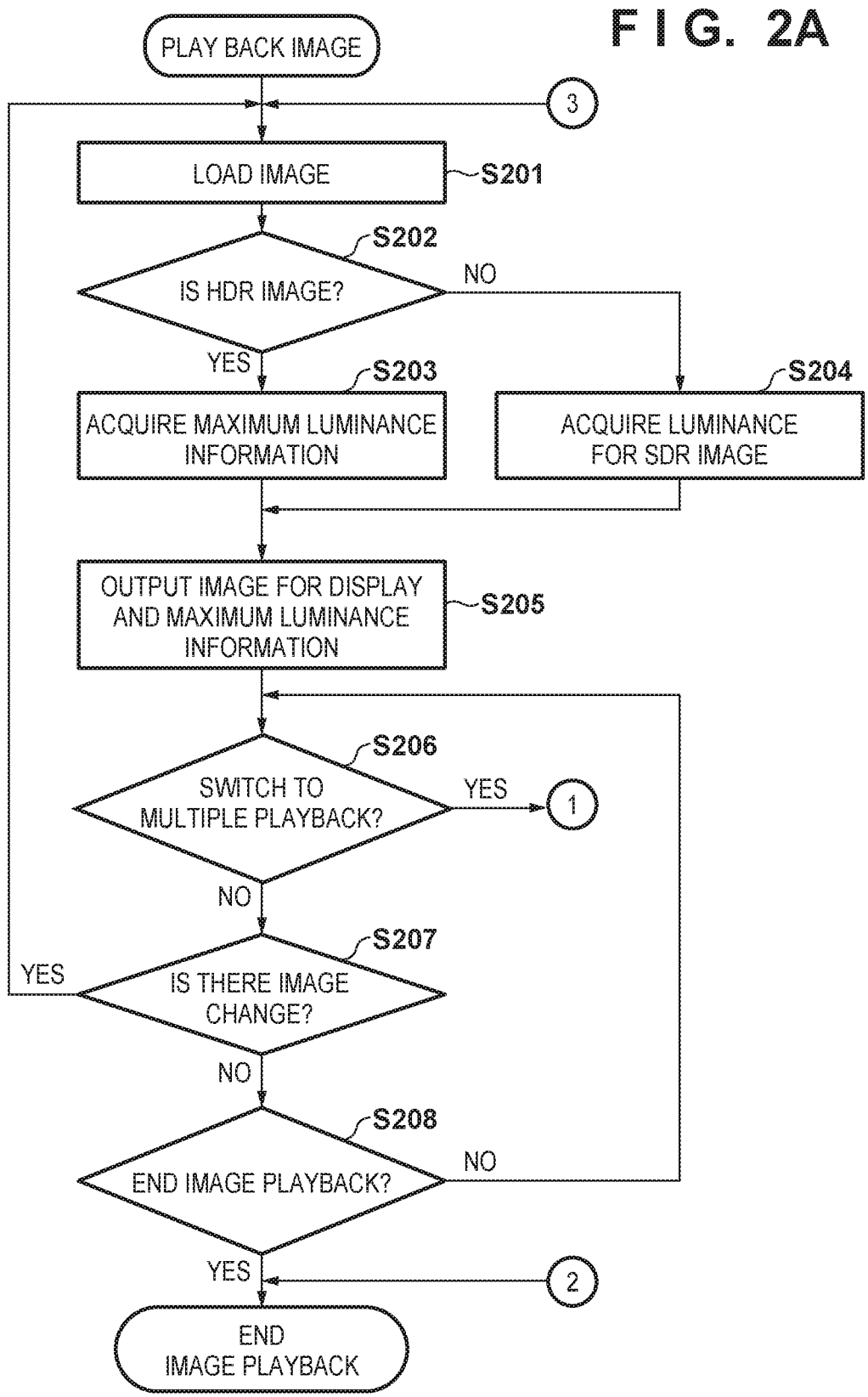
Figure 2B:
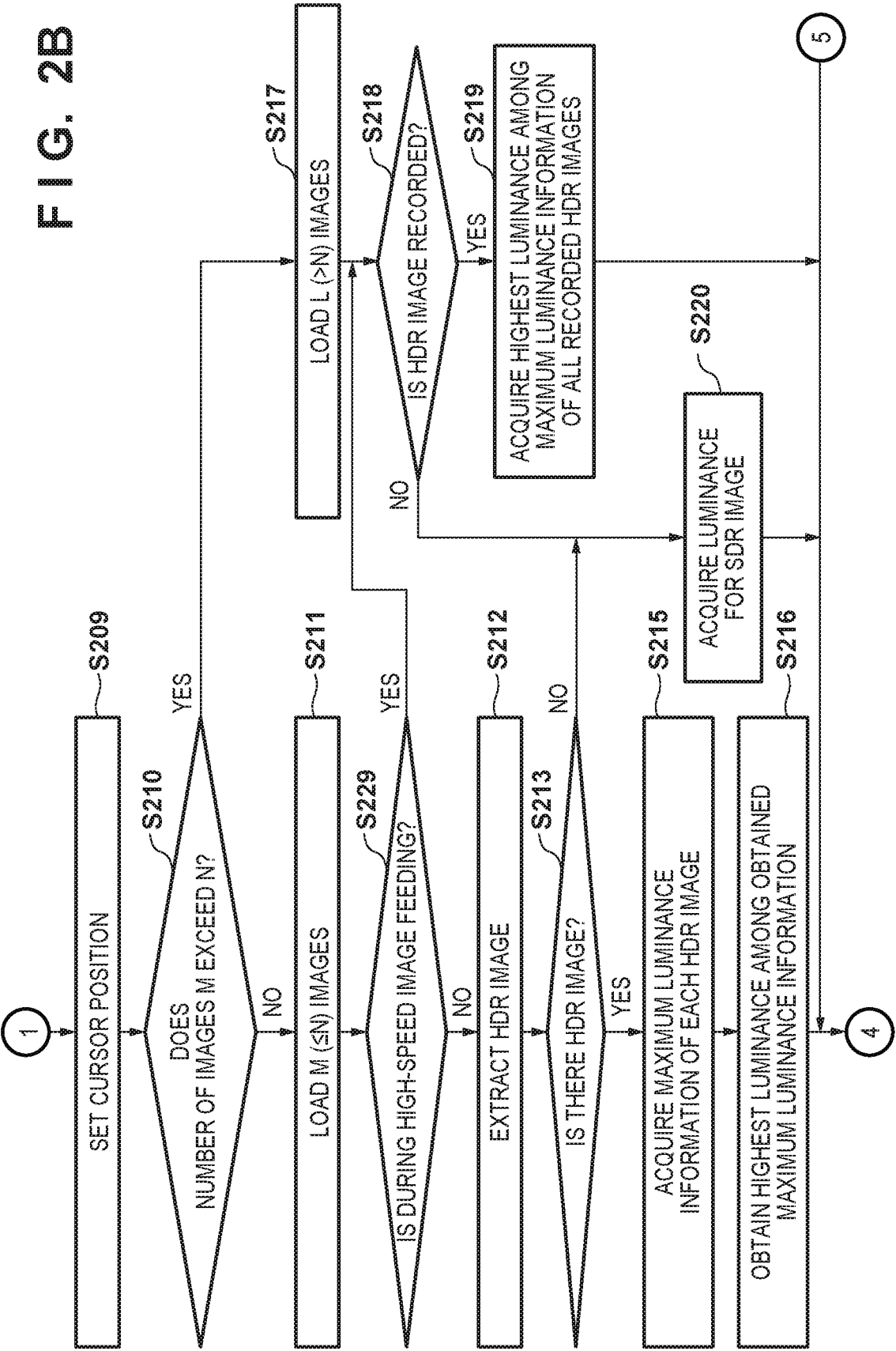

An image playback operation by the digital camera 100 according to the present embodiment provided with components as described above will be described with reference to FIGS. 2A, 2B and 2C. FIGS. 2A to 2C are flowcharts illustrating operations executed in the image playback mode when the digital camera 100 is connected to the external display apparatus 200 and outputs the image data to the external display apparatus 200 for display. FIG. 2A primarily illustrates operations in the single playback mode, and FIGS. 2B and 2C primarily illustrate operations in the multiple playback mode. In a case where the playback mode is instructed by the mode switch included in the operation unit 63, the digital camera 100 starts the image playback mode for browsing the image data recorded in the external storage medium 91. In the image playback mode, first, the single playback mode for displaying one image in one frame is executed, and switching to the multiple playback mode for displaying a plurality of images in one frame is executed in response to the user operation.

When the image playback mode is started, the mode control unit 501 sets the image playback mode to the single playback mode. At S201, the reading unit 502 loads one image data to be displayed, from the external storage medium 91 into the memory 25 via the card control unit 90. Here, the image data read by the reading unit 502 may be the last image data captured by the digital camera 100, or arbitrary image data based on a file number assigned to a filename of the image data Additionally, in the case where the image data is a moving image data, the metadata regarding the entire moving image data, or a part of the moving image data including a first frame and the metadata regarding the first frame, can be read.

At S202, the luminance setting unit 503 determines whether the image data read at S201 is an HDR image. A determination of whether the image data is an HDR image may be achieved based on the metadata included in the image data, a recording method, a recording format for the image data, and the like. In a case where the read image data is determined to be an HDR image, a processing proceeds to S203. At S203, the luminance setting unit 503 uses the metadata generation and analysis unit 70 to process the metadata of the read HDR image and acquires the maximum luminance information recorded in the HDR image.

At S205, the generation unit 504 generates an image for display to be displayed on the external display apparatus 200 from the read image data via the decompression processing, the resizing processing, and the like included in the image processing unit 20 and stores the image for display in the memory 25. The output unit 505 associates the image for display generated by the generation unit 504 with the dynamic metadata including the maximum luminance information acquired by the luminance setting unit 503 at S203, and outputs the result to the external display apparatus 200 via the image output unit 71.

Figure 3A:
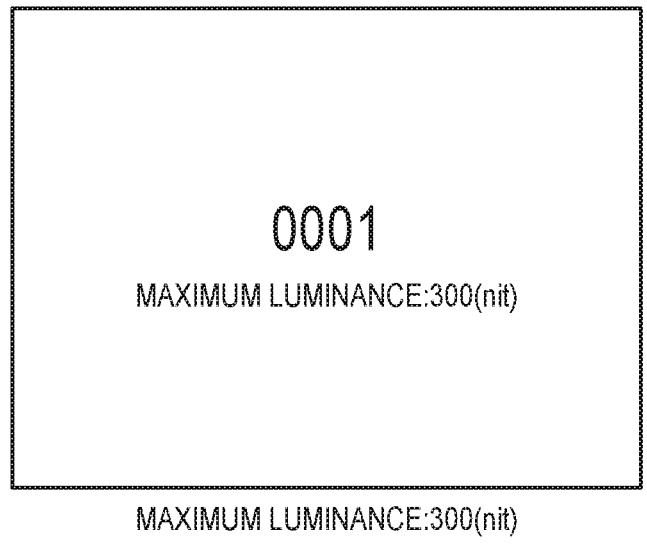
FIGS. 3A to 3E are schematic diagrams of a screen display according to the first embodiment.

FIG. 3A is a schematic diagram of a screen when image data identified by a file number of 0001 included in the external storage medium 91 is displayed on the external display apparatus 200 from the digital camera 100. It is assumed that the 0001 image data is an HDR image and that a maximum luminance of 300 nit is recorded in the metadata. FIG. 3A indicates that, with the digital camera 100 outputting the 0001 image data together with the dynamic metadata indicating a maximum luminance of 300 nit, the external display apparatus 200 can display the 0001 HDR image at a maximum luminance of 300 nit.

Referring back to FIG. 2A, in a case where the image data read by the reading unit 502 at S202 is not an HDR image (for instance, in a case where the Standard Dynamic Range (SDR) image), the processing proceeds to S204. At S204, the luminance setting unit 503 sets the luminance for the SDR image. For instance, the REC. 709 standard defines an upper limit of 100 nit, and thus, in the present embodiment, a maximum luminance of 100 nit is set.

At S206, the mode control unit 501 determines whether the multiple playback, in which a list of a plurality of image data is displayed, has been instructed by the user operation. In a case where the multiple playback is not instructed, in other words, in a case where the single playback is maintained, the processing proceeds to S207. At S207, the mode control unit 501 determines whether the user has designated another image (whether an image change has been instructed).

The user can change (select) image data to be displayed on the external display apparatus 200 using the directional pad included in the operation unit 63 and the like. In a case where the image data to be displayed is changed, the processing returns to S201 to repeat the processing described above. In other words, the reading unit 502 reads the designated image data, and the luminance setting unit 503 sets the maximum luminance for the image data to be displayed. Such processing allows appropriate switching, for display, of the luminance of the image display in the single playback mode in the external display apparatus 200.

At S207, in a case where it is determined no image change has been instructed, the processing proceeds to S208. At S208, the mode control unit 501 determines whether the image playback has been instructed to end. At S208, in a case where the end of the image playback has been determined to be instructed, the mode control unit 501 ends the present processing (image playback mode). In a case where the end of the image playback is not instructed, the processing returns to S206.

At S206, in a case where the multiple playback, in which a list of a plurality of image data is displayed, is instructed by an operation component included in the operation unit 63, the processing proceeds to S209 (FIG. 2B), and the mode control unit 501 controls the reading unit 502, the luminance setting unit 503, and the generation unit 504 to execute the multiple playback.

At S209, the cursor control unit 506 determines which position on the display screen to be set as the position of the cursor operated by the user in displaying a list of a plurality of image data on the external display apparatus 200. At S210, the mode control unit 501 determines whether the number of image M in the list display exceeds a predetermined number (N). In the description of the present embodiment, as examples of patterns of the list display, two patterns of vertical 2 images×horizontal 2 images (M=4) and vertical 3 images×horizontal 3 images (M=9) are used. Additionally, the predetermined number N is assumed to be 4 (N=4). In a case where the multiple playback is instructed while in the state of the single playback, it is initially assumed to make a transition to the pattern of vertical 2 images×horizontal 2 images. In this case, the number of images M (=4) in the list display does not exceed N, thus the processing proceeds to S211.

At S211, the reading unit 502 loads image data of M images (four in the above-described example) from the external storage medium 91 into the memory 25. In a case where the image data is large in size, a part of the image data may be read, such as a small recording size image for display separately recorded in the image data (for instance, reduced image) and the metadata. At S229, the luminance setting unit 503 determines whether a high-speed image feeding is in progress. The high-speed image feeding will described later. Here, it is assumed that the high-speed image feeding is not in progress and that the processing proceeds to S212.

At S212, the luminance setting unit 503 extracts the HDR image from among the image data read at S211. As with S202, whether the image data is an HDR image can be determined from the metadata, the recording method, the recording format for image data, and the like. At S212, in a case where no HDR image can be extracted, the processing proceeds to S220. At S220, the luminance setting unit 503 obtains luminance information (100 nit) for the SDR image.

On the other hand, at S212, in a case where it is determined to include an HDR image, the processing proceeds to S215. At S215, the luminance setting unit 503 uses the metadata generation and analysis unit 70 to process the metadata of each HDR image extracted at S212, thus obtaining the maximum luminance information of each HDR image. At S216, the luminance setting unit 503 obtains the highest luminance among the maximum luminance information that has been successfully obtained.

In S221, the generation unit 504 arranges the read M image data in a designated pattern (for instance, vertical 2 images×horizontal 2 images), and generates an image for display to be displayed on the external display apparatus 200. The generation unit 504 uses the decompression processing or the resizing processing included in the image processing unit 20 to generate images for display from each of the image data, arranges the images according to the designated pattern to generate an image for display to be displayed on the external display apparatus 200, and stores the image in the memory 25. Additionally, the generation unit 504 places a display component indicating a cursor position at the cursor position determined at S209. At S222, the output unit 505 associates the image for display generated by the generation unit 504 with the dynamic metadata including the maximum luminance information obtained by the luminance setting unit 503, and outputs the result to the external display apparatus 200 via the image output unit 71.

Figure 3B:
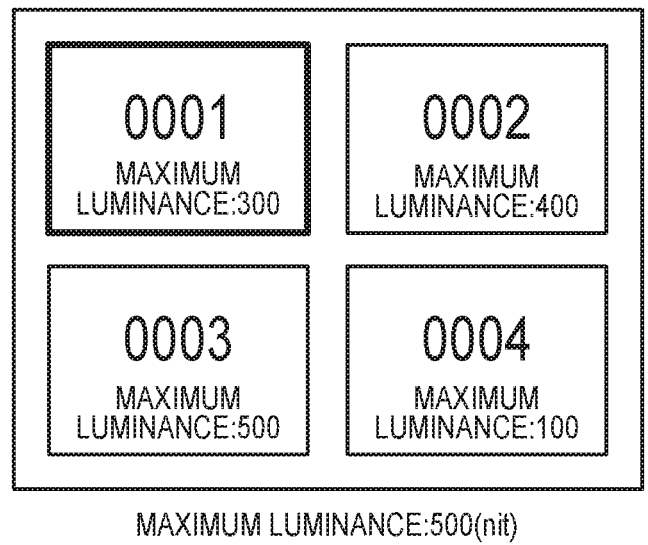

FIG. 3B is a schematic diagram illustrating a display state of the display apparatus 200 when the display state of the single playback in FIG. 3A is switched to the multiple playback. In a case where the multiple playback is started in the state of the single playback with the 0001 image data displayed, the image data identified by the numbers 0002 to 0004 subsequent to the number 0001 recorded in the external storage medium 91 are arranged in form of vertical 2 images×horizontal 2 and displayed. The cursor position is placed to correspond to the 0001 image where the multiple playback is instructed.

At this time, in a case where the 0001 to 0004 image data respectively hold, as the metadata, the maximum luminance information as illustrated in the figure, the image for display is output to the external display apparatus 200 such that the images are displayed at the highest luminance of 500 nit, which is the highest among the maximum luminance information. In this way, all the 0001 to 0004 image data displayed are prevented from reaching the maximum luminance for each image data. Thus, all the image data in the multiple playback can reproduce an entire gradation. As a result, all the image data may avoid an error such as a partially blown-out highlights, and the user can view a plurality of images displayed at the same time, while comparing the images with one another.

At S223, the cursor control unit 506 determines whether the user has instructed a movement of the cursor position using the directional pad included in the operation unit 63, and the like. In a case where the movement of the cursor position has been determined to be instructed, the processing proceeds to S224. At S224, the cursor control unit 506 determines whether the combination of the image data in the multiple playback is changed in response to the movement of the cursor position, that is, whether the displayed image in the multiple playback needs to be switched. In a case where no switching of the displayed image in the multiple playback has been determined to be necessary, the processing proceeds to S225. At S225, the cursor control unit 506 gives notice of the cursor position after the movement to the generation unit 504. Subsequently, the processing returns to S221, where the generation unit 504 generates an image for display with the cursor position changed, and the output unit 505 outputs the image. The combination of images remains unchanged, and thus the maximum luminance information remains unchanged.

Figure 3C:
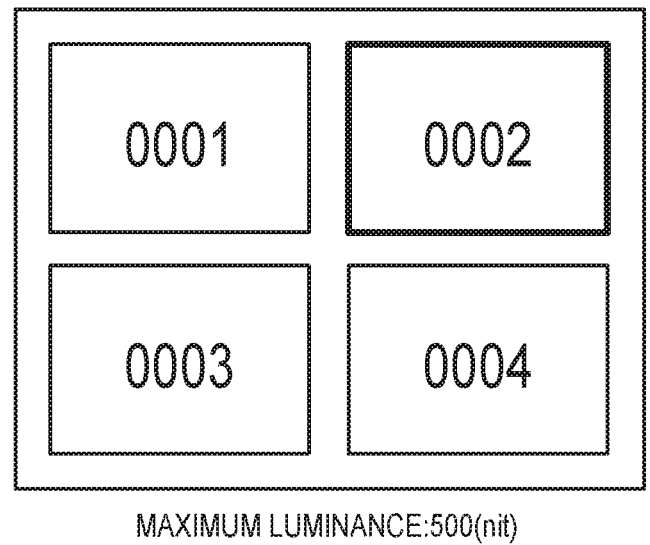

For instance, in the display state in FIG. 3B, in a case where the directional pad included in the operation unit 63 is used to instruct the movement of the cursor position to the 0002 image on the right side, the cursor position is changed at S225, leading to display as illustrated in FIG. 3C. In this case, the image data displayed remains unchanged, and thus no change is made to the maximum luminance.

On the other hand, at S224, in a case where switching of the displayed image in the multiple playback has been determined to be necessary, the processing returns to S209 to repeat the above-described processing. The cursor control unit 506 designates the cursor position after the movement, and the reading unit 502 newly loads M images. However, in a case where there is image data that has already been loaded, only the newly required image data may be loaded.

Figure 3D:
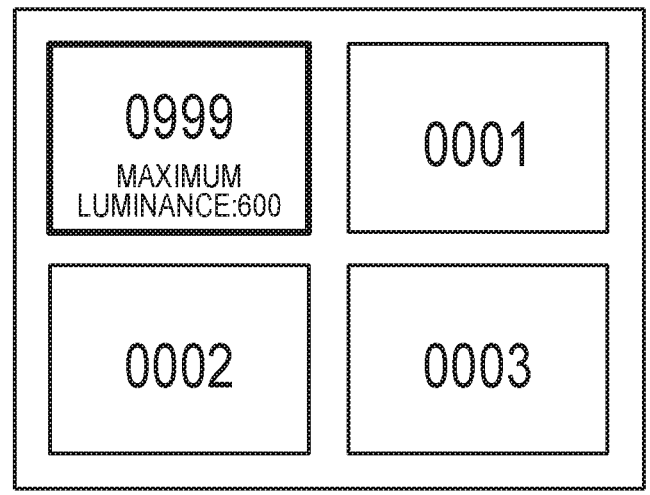

For instance, in FIG. 3B, in a case where the directional pad included in the operation unit 63 is used to instruct display of the image data recorded preceding the 0001 image, the processing returns from S224 to S209. In this way, for instance, in a case where the image immediately preceding the 0001 image has a number 0999, the combination of the image data to be displayed is switched to image data with the numbers 0999 and 0001 to 0003 as illustrated in FIG. 3D. Additionally, in response to the image switching, the maximum luminance information of the read image data to be displayed may change. Thus, the luminance displayed on the external display apparatus 200 also changes in response to the image switching.

Now, processing will be described where in a case where the number of images to be displayed in one frame in the multiple playback is changed. At S226, the mode control unit 501 determines whether the number of images to be displayed in a list for the multiple playback has been changed by the operation component included in the operation unit 63. In a case where the change in the number of images has been instructed, the processing returns to S209 to start the multiple playback with a newly set number of images. The following description takes an example in which an increase in the number of images to be displayed in a list are instructed, such as from the multiple playback with vertical 2 images×horizontal 2 images to the multiple playback with vertical 3 images×horizontal 3 images.

At S209, the cursor control unit 506 sets the cursor position. At S210, the mode control unit 501 determines that the number of image M (=9) to be displayed exceeds a predetermined number N(=4) and advances the processing to S217. At S217, the reading unit 502 loads the image data corresponding to a set number (M=9) of images to be displayed and stores the image data in the memory 25. As with S211, a part of the image data to be displayed (including an image for display with a small recording size and the metadata) may be read. Subsequently, the processing in S218 to S220 causes the luminance setting unit 503 to set the maximum luminance information associated with the image for display for the multiple playback to the highest luminance among the maximum luminance information of all the HDR images recorded in the external storage medium 91, or the luminance for SDR image. Thus, in a case where the set number (M) of images in the multiple playback exceeds the predetermined number (N), the luminance setting unit 503 fixes, to a predetermined value, the luminance indicated by the maximum luminance information associated with the image for display.

At S218, the luminance setting unit 503 determines whether any HDR image data has been recorded in the external storage medium 91. In a case where the HDR image has been determined to be recorded in the external storage medium 91, the processing proceeds to S219. At S219, the luminance setting unit 503 acquires the highest maximum luminance among the maximum luminance information of all the HDR images recorded in the external storage medium 91. This highest luminance may be calculated in advance when the image data is recorded in the external storage medium 91. Alternatively, for example, a luminance preliminarily calculated and stored in the non-volatile memory 51 or the external storage medium 91 may be acquired and utilized. In a case where, at S218, no HDR image has been determined to be recorded in the external storage medium 91, the processing proceeds to S220. At S220, the luminance setting unit 503 acquires the luminance information for the SDR image.

Note that, at S219, all HDR images recorded in the external storage medium 91 are targeted, but no such limitation is intended. For instance, in a case where, in the external storage medium 91, images are managed using folders, at S219, the luminance setting unit 503 may set the luminance for all the HDR images in a folder to which a currently displayed image belongs.

Figure 3E:
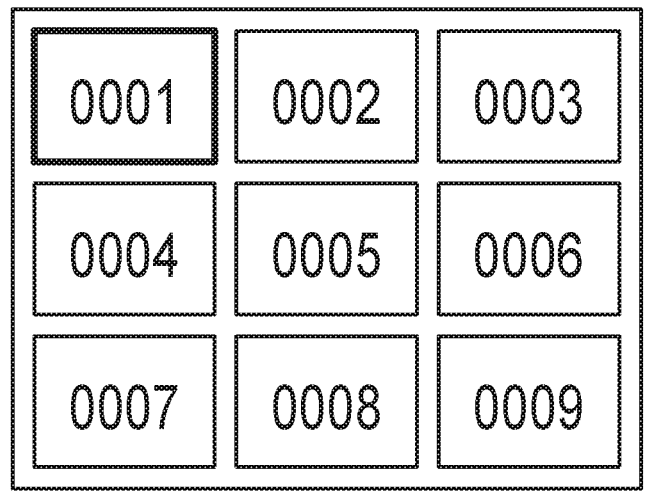

FIG. 3E is a schematic diagram of a screen in a case where, in the state of FIG. 3B, an increase in the number of image data displayed in the multiple playback is instructed. FIG. 3E illustrates an example in which, regardless of the maximum luminance of the 0001 to 0009 images that are displayed, the highest luminance information among the HDR images (800 nit in this example) included in the external storage medium 91 is set for the external display apparatus 200. Thus, no image is displayed with blown-out highlights even when many images are displayed in one frame. In addition, acquiring the highest luminance information among the HDR images included in the external storage medium 91 once eliminates necessity to examine the maximum luminance information of all the images each time the displayed image is switched. This enables high-speed display.

Referring back to FIG. 2C, at S227, the mode control unit 501 determines whether the end of the multiple playback has been instructed by the operation component included in the operation unit 63. In a case where the end of the multiple playback has been instructed, the processing returns to S201 to start the single playback. In a case where the end of the multiple playback has not been instructed, the processing proceeds to S228. At S228, the mode control unit 501 determines whether the end of the image playback mode has been instructed by the operation component included in the operation unit 63. In a case where the end of the image playback mode has not been instructed, the process returns to S223 and the multiple playback is maintained. On the other hand, in a case where the end of the image playback mode has been instructed, the image playback mode is ended.

At S229, in a case where the luminance setting unit 503 determines the high-speed image feeding is being executed, the processing proceeds to S218. Thus, even in a case where the number M of images displayed in one frame in the multiple playback is equal to or smaller than the predetermined number N, the display luminance is fixed to a predetermined value in a case where high-speed switching of the displayed image is occurring due to the high-speed image feeding.

In the present embodiment, case of the high-speed image feeding refers to a case where a change frequency of the combination of images constituting the set number of images in the multiple playback exceeds a predetermined frequency due to the movement of the cursor, for instance. Such high-speed image feeding occurs, for instance, in a case where the cursor position is repeatedly changed at short time intervals by the operation component included in the operation unit 63. In a case where the high-speed switching of the displayed image occurs, the luminance setting unit 503 executes processing (S218 to S220) using the maximum luminance of the images included in the external storage medium 91, instead of executing processing (S212 to S216) using the maximum luminance of the images to be displayed. This allows suppression of display flickering associated with frequent changes in luminance displayed when the displayed image is switched at high-speed.

Note that, at S219, the maximum luminance information of all the HDR images recorded in the external storage medium 91 (or in the folder) is used as described above. However, no such limitation is intended in a case where S219 is executed responding to the change frequency exceeding the predetermined frequency (based on a YES determination at S229). For instance, as the predetermined value, the luminance indicated by the maximum luminance information added to the image for display may be used at the instant when the change frequency exceeds the predetermined frequency.

As described above, according to the first embodiment, display at the appropriate luminance is achieved when a plurality of images including the HDR images are displayed in the multiple playback.

Second Embodiment

In regard to the usage of the multiple playback mode, the multiple playback mode may be utilized to quickly find an intended image data from among a large number of image data recorded in the external storage medium 91. In such a case, even in the list display state, it may be desirable that only the intended image is displayed properly at the correct luminance without being affected by other images. The second embodiment corresponds to a configuration provided in view of such a problem. Note that the configuration of a digital camera and the functional configuration of the system control unit 50 according to the second embodiment are the same as those in the first embodiment (FIGS. 1A and 1B).

However, in the second embodiment, the luminance setting unit 503 switches the processing depending on whether, among a set number of images displayed in one frame in the multiple playback, an image designated by a user operation is an HDR image. Image designation based on a user operation is executed by, for instance, the cursor moved by the user operation. In a case where the designated image is an HDR image, the luminance setting unit 503 sets, for a display region of the HDR image in the image for display, the luminance indicated by the maximum luminance information of the HDR image. The output unit 505 adds, to the image for display generated by the generation unit 504, information indicating the luminance and the display region set by the luminance setting unit 503, and outputs the resultant image for display to the display apparatus 200 via the image output unit 71. In this case, a predetermined luminance (for example, an SDR luminance) is set for the other regions. Additionally, in a case where the image designated by the cursor is not an HDR image, the luminance setting unit 503 sets the predetermined luminance (e.g., the SDR luminance) for the overall display region of the image for display.

Figure 4:
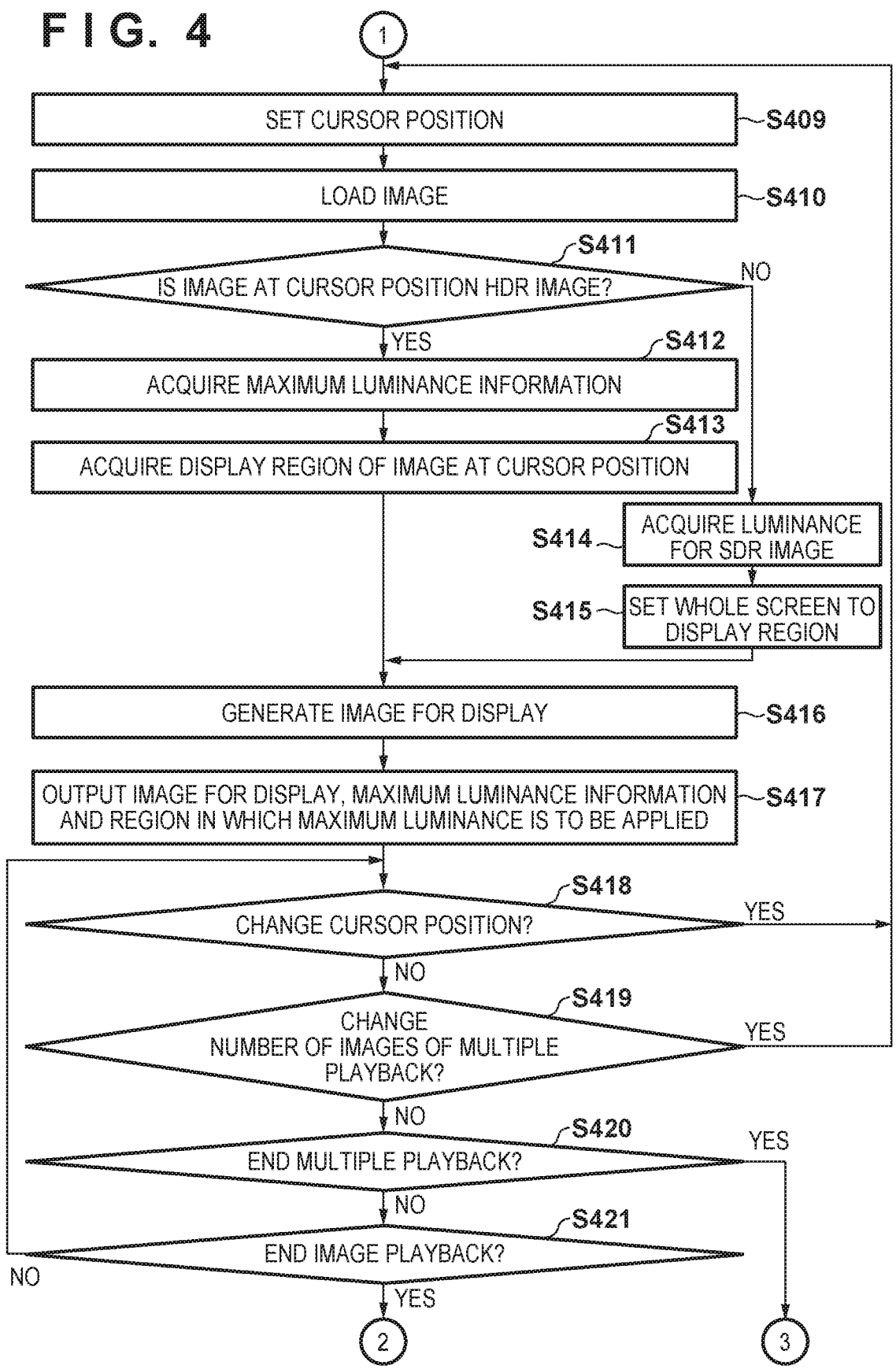
FIG. 4 is a flowchart illustrating an operation in an image playback mode (multiple playback) according to a second embodiment.

FIG. 4 is a flowchart illustrating operations executed in the image playback mode (multiple playback) when the digital camera 100 according to the second embodiment is connected to the external display apparatus 200 and outputs the image data to the external display apparatus 200 for display. Note that the operations executed in the single playback are the same as those in the first embodiment (FIG. 2A). At S206, in a case where the multiple playback is instructed, the processing proceeds to S409 in FIG. 4.

At S409, the cursor control unit 506 sets the position, in the multiple playback, of the cursor operated by the user. At S410, the reading unit 502 loads image data of a plurality of (M) images to be displayed in a list, from the external storage medium 91 into the memory 25. As in the first embodiment, in a case where the image data is large in size, a part of the image data may be read, such as a small recording size image for display separately recorded in the image data and the metadata.

At S411, the luminance setting unit 503 determines whether the image corresponding to the cursor position among the image data read at S410 is an HDR image. In a case where the image is determined to be an HDR image, the processing proceeds to S412. At S412, the luminance setting unit 503 acquires the maximum luminance information from the metadata of the image data (the HDR image) corresponding to the cursor position. At S413, the luminance setting unit 503 acquires the display region for the image for display in the image data corresponding to the cursor position.

At S416, the generation unit 504 arranges the plurality of (M) image data that has been read in a predetermined pattern (for instance, vertical 2 images×horizontal 2 images) to generate an image for display to be displayed on the external display apparatus 200. The generation unit 504 uses the decompression processing or the resizing processing included in the image processing unit 20 to generate images for display from each of the image data, arranges the images according to the predetermined pattern above to generate the image for display to be displayed on the display apparatus 200, and stores the image in the memory 25. Additionally, the image for display is generated such that the cursor position is also located at a predetermined position.

At S417, the output unit 505 associates the image for display generated by the generation unit 504 with the dynamic metadata including the maximum luminance information acquired by the luminance setting unit 503 and the information indicating the display region acquired at S413 as the region to which the maximum luminance information is to be applied, and outputs the result. Note that the dynamic metadata includes information used to set the luminance for the regions other than the display region above to an SDR equivalent luminance (100 nit), for instance. Thus, the image for display associated with the dynamic metadata is output from the image output unit 71 to the external display apparatus 200. The external display apparatus 200 displays the image for display in accordance with the dynamic metadata to provide multiple playback display. Note that the external display apparatus 200, for instance, supports local dimming, and can set a different luminance locally such that a designated display region can be displayed at a designated maximum luminance.

Figure 5:
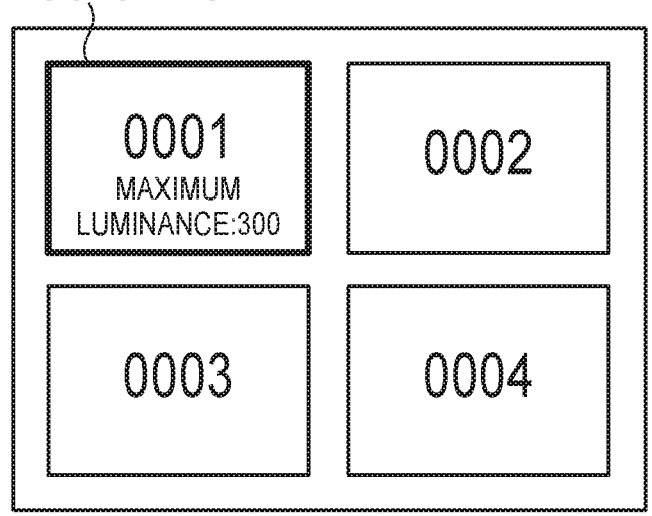
FIG. 5 is a schematic diagram of a screen display according to the second embodiment.

FIG. 5 is a schematic diagram of 0001 image data and subsequent image data identified by the numbers 0002 to 0004 and recorded in the external storage medium 91, the image data being arranged and displayed in form of vertical 2 images and horizontal 2 images. The cursor position is set at the 0001 image for which the multiple playback is instructed. According to the second embodiment, the external display apparatus 200 can exclusively display, at the maximum luminance of the 0001 image data, the region where the 0001 image data is displayed. The other 0002 to 0004 images are displayed at the SDR image-equivalent luminance. Compared to FIG. 3B, the images other than the 0001 image having high luminance are displayed at a low luminance, and thus, even in a state of an image display in multiscreen form, the 0001 image can be visually recognized as the original 0001 image without being affected by the other images having high luminance.

Referring back to FIG. 4, at S411, in a case where the image corresponding to the cursor position is determined not to be an HDR image, the processing proceeds to S414. At S414, the luminance setting unit 503 acquires the luminance for SDR image. Then, at S415, the luminance setting unit 503 sets the luminance such that a whole screen is displayed at the luminance for SDR image. Subsequently, S416 and S417 described above are executed to output the image for display added with the dynamic metadata.

The processing at S418 to S421 is similar to S223 and S226 to S228 in FIG. 2C. That is, at S418, the cursor control unit 506 determines whether the user has instructed a movement of the cursor position using the directional pad included in the operation unit 63 and the like. In a case where it is determined that the movement of the cursor position has been instructed, the processing returns to S409. At S419, the mode control unit 501 determines whether the number of images to be displayed in a list for the multiple playback has been changed by the operation component included in the operation unit 63. In a case where it is determined that the number of images has been changed, the processing returns to S409. At S420, the mode control unit 501 determines whether the end of the multiple playback has been instructed by the operation component included in the operation unit 63. In a case where it is determined that the end of the multiple playback has been instructed, the processing returns to S201 to start the single playback. At S421, the mode control unit 501 determines whether the end of the image playback mode has been instructed by the operation component included in the operation unit 63. In a case where the end of the image playback mode has not been instructed, the processing returns to S418 to maintain the multiple playback. On the other hand, in a case where the end of the image playback mode has been instructed, the image playback mode is ended.

As described above, according to the second embodiment, when a plurality of images including an HDR images are displayed in the multiple playback, the HDR image of interest can be displayed at the appropriate luminance.

Other Embodiments

Embodiment(s) of the present invention can also be realized by a computer of a system or apparatus that reads out and executes computer executable instructions (e.g., one or more programs) recorded on a storage medium (which may also be referred to more specifically as a "non-transitory computer-readable storage medium") to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-058901, filed Mar. 26, 2019, which is hereby incorporated by reference herein in its entirety.

What is claimed is:

1. An image output apparatus configured to output data for a multiple playback, the multiple playback displaying two or more images arranged in one frame, the image output apparatus comprising:
    one or more processors; and
    at least one memory coupled to the one or more processors, the at least one memory having instructions stored thereon which, when executed by the one or more processors, cause the one or more processors to perform operations of following units:
    a reading unit configured to read a set number of images in the multiple playback from a recording unit;
    a generation unit configured to generate an image for display for the multiple playback by using the set number of images read by the reading unit;
    a setting unit configured to set a maximum luminance information of the image for display to a highest luminance among luminance indicated by a maximum luminance information of an HDR image included in the set number of images read by the reading unit; and
    an output unit configured to add the maximum luminance information set by the setting unit to the image for display generated by the generation unit and to output the image for display.

2. The apparatus according to claim 1, wherein, in a case where the set number of images read by the reading unit include no HDR image, the setting unit sets the maximum luminance information of the image for display to a predetermined luminance.

3. The apparatus according to claim 2, wherein the predetermined luminance is a luminance for an SDR.

4. The apparatus according to claim 1, wherein, in a case where a change frequency of a combination of images constituting the set number of images exceeds a predetermined frequency, the setting unit fixes the luminance indicated by the maximum luminance information of the image for display to a predetermined value.

5. The apparatus according to claim 1, wherein
    a user can designate the set number, and
    in a case where the set number exceeds a predetermined number, the setting unit fixes the luminance indicated by the maximum luminance information associated with the image for display to a predetermined value.

6. The apparatus according to claim 4, wherein the setting unit uses, as the predetermined value, a highest luminance among luminance indicated by the maximum luminance information of all HDR images recorded in the recording unit.

7. The apparatus according to claim 4, wherein the setting unit uses, as the predetermined value, the luminance indicated by the maximum luminance information added to the image for display at an instant when the change frequency exceeds the predetermined frequency.

8. An image output apparatus configured to output data for a multiple playback, the multiple playback displaying two or more images arranged in one frame, the image output apparatus comprising:
  one or more processors; and
  at least one memory coupled to the one or more processors, the at least one memory having instructions stored thereon which, when executed by the one or more processors, cause the one or more processors to perform operations of following units:
  a reading unit configured to read a set number of images in the multiple playback from a recording unit;
  a generation unit configured to generate an image for display for the multiple playback by using the set number of images read by the reading unit;
  a setting unit configured to set, in a case where an image designated by a user operation among the set number of images is an HDR image, a luminance indicated by a maximum luminance information of the HDR image for a display region of the designated image in the image for display; and
  an output unit configured to add information indicating the luminance and the display region set by the setting unit to the image for display generated by the generation unit and to output the image for display.

9. The apparatus according to claim 8, wherein the setting unit sets a predetermined luminance for a region other than the display region for the image for display.

10. The apparatus according to claim 8, wherein, in a case where the image designated by the user operation is not an HDR image, the setting unit sets the maximum luminance information to a predetermined luminance and sets the display region to the entire image for display.

11. The apparatus according to claim 10, wherein the predetermined luminance is a luminance for an SDR.

12. The apparatus according to claim 8, wherein, in reading the set number of images, the reading unit reads a reduced image and a metadata of image recorded in the recording unit.

13. A control method for an image output apparatus configured to output data for a multiple playback, the multiple playback displaying two or more images arranged in one frame, the control method comprising:
  reading a set number of images in the multiple playback from a recording unit;
  generating an image for display for the multiple playback by using the set number of images;
  setting a maximum luminance information of the image for display to a highest luminance among luminance indicated by a maximum luminance information of an HDR image included in the set number of images; and
  adding the maximum luminance information to the image for display and outputting the image for display.

14. A control method for an image output apparatus configured to output data for a multiple playback displaying two or more images arranged in one frame, the control method comprising:
  reading a set number of images in the multiple playback from a recording unit;
  generating an image for display for the multiple playback by using the set number of images;
  setting, in a case where an image designated by a user operation among the set number of images is an HDR image, a luminance indicated by a maximum luminance information of the HDR image, for a display region of the designated image in the image for display; and
  adding information indicating the luminance and the display region to the image for display and outputting the image for display.

15. A non-transitory computer-readable storage medium including a program stored therein, the program being used to cause a computer to execute a control method for an image output apparatus configured to output data for a multiple playback displaying two or more images arranged in one frame, the control method comprising:
  reading a set number of images in the multiple playback from a recording unit;
  generating an image for display for the multiple playback by using the set number of images;
  setting a maximum luminance information of the image for display to a highest luminance among luminance indicated by a maximum luminance information of an HDR image included in the set number of images; and
  adding the set maximum luminance information to the image for display and outputting the image for display.

16. A non-transitory computer-readable storage medium including a program stored therein, the program being used to cause a computer to execute a control method for an image output apparatus configured to output data for a multiple playback displaying two or more images arranged in one frame, the control method comprising:
  reading a set number of images in the multiple playback from a recording unit;
  generating an image for display for the multiple playback by using the set number of images;
  setting, in a case where an image designated by a user operation among the set number of images is an HDR image, a luminance indicated by a maximum luminance information of the HDR image, for a display region of the designated image in the image for display; and
  adding information indicating the set luminance and the display region to the image for display and outputting the image for display.

17. The apparatus according to claim 1, wherein, in reading the set number of images, the reading unit reads a reduced image and a metadata of image recorded in the recording unit.

* * * * *